(12) United States Patent
Godbole et al.

(10) Patent No.: US 12,450,217 B1
(45) Date of Patent: Oct. 21, 2025

(54) SYSTEMS AND METHODS FOR AGENT-CONTROLLED FEDERATED RETRIEVAL-AUGMENTED GENERATION

(71) Applicant: Instabase, Inc., Dover, DE (US)

(72) Inventors: Shaunak Godbole, San Francisco, CA (US); Shih Ping Chang, San Francisco, CA (US); Clemens Mewald, Lafayette, CA (US); Anant Bhardwaj, San Francisco, CA (US)

(73) Assignee: Instabase, Inc., Dover, DE (US)

( * ) Notice: Subject to any disclaimer, the term of this patent is extended or adjusted under 35 U.S.C. 154(b) by 0 days.

(21) Appl. No.: 18/413,532

(22) Filed: Jan. 16, 2024

(51) Int. Cl.
*G06F 16/22* (2019.01)
*G06F 40/40* (2020.01)

(52) U.S. Cl.
CPC .......... *G06F 16/2237* (2019.01); *G06F 40/40* (2020.01)

(58) Field of Classification Search
CPC ...... G06F 16/2237; G06F 40/40; G06F 40/20; G06F 40/30
See application file for complete search history.

(56) References Cited

U.S. PATENT DOCUMENTS

| | | |
|---|---|---|
| 5,848,184 A | 12/1998 | Taylor |
| 5,898,795 A | 4/1999 | Bessho |
| 7,620,976 B2 | 11/2009 | Low |
| 7,689,431 B1 | 3/2010 | Carmel |
| 7,720,318 B1 | 5/2010 | Phinney |
| 7,725,423 B1 | 5/2010 | Pricer |
| 8,254,681 B1 | 8/2012 | Poncin |
| 8,881,307 B2 | 11/2014 | Nun |
| 9,275,030 B1 | 3/2016 | Fang |
| 9,607,058 B1 | 3/2017 | Gupta |
| 10,242,212 B2 | 3/2019 | Tegegne |
| 10,642,832 B1 | 5/2020 | Neumann |
| 10,679,089 B2 | 6/2020 | Annis |

(Continued)

FOREIGN PATENT DOCUMENTS

| | | | | |
|---|---|---|---|---|
| CN | 117951274 A | * | 4/2024 | ............. G06N 5/022 |
| CN | 118332072 A | * | 7/2024 | ............. G06N 5/041 |

(Continued)

OTHER PUBLICATIONS

Chaudhuri et al., "Extraction of type style-based meta-information from imaged documents", IJDAR (2001) 3: 138-149. (Year: 2001).

(Continued)

*Primary Examiner* — Kavita Stanley
*Assistant Examiner* — Cecile H Vo (57) ABSTRACT

Systems and methods for controlling retrieval-augmented generation (RAG) using a set of vector databases are disclosed. Exemplary implementations may: convert content within sets of electronic files into sets of vector embeddings stored in vector databases; receive user input representing a user query; generate agent queries based on tasks included in the user query; select subsets of the vector embeddings based on the agent queries; provide the subsets to one or more machine learning models as context; provide prompts to the one or more machine learning models; obtain replies in response to the prompts; generate a reply to the user query; effectuate a presentation of the reply, and/or perform other steps.

18 Claims, 6 Drawing Sheets

(56) References Cited

U.S. PATENT DOCUMENTS

| | | | |
|---|---|---|---|
| 11,315,353 B1 | 4/2022 | Cahn | |
| 11,947,604 B2 | 4/2024 | Roitman | |
| 11,995,394 B1 | 5/2024 | Morariu | |
| 12,182,125 B1* | 12/2024 | Buniatyan | G06N 3/08 |
| 2002/0064316 A1 | 5/2002 | Takaoka | |
| 2004/0181749 A1 | 9/2004 | Chellapilla | |
| 2004/0223648 A1 | 11/2004 | Hoene | |
| 2005/0289182 A1 | 12/2005 | Pandian | |
| 2008/0148144 A1 | 6/2008 | Tatsumi | |
| 2008/0212901 A1 | 9/2008 | Castiglia | |
| 2008/0291486 A1 | 11/2008 | Isles | |
| 2009/0076935 A1 | 3/2009 | Knowles | |
| 2009/0132590 A1 | 5/2009 | Huang | |
| 2012/0072859 A1 | 3/2012 | Wang | |
| 2012/0204103 A1 | 8/2012 | Stevens | |
| 2014/0200880 A1 | 7/2014 | Neustel | |
| 2014/0214732 A1 | 7/2014 | Carmeli | |
| 2015/0012422 A1 | 1/2015 | Ceribelli | |
| 2015/0169951 A1 | 6/2015 | Khintsitskiy | |
| 2015/0169995 A1 | 6/2015 | Panferov | |
| 2015/0278197 A1 | 10/2015 | Bogdanova | |
| 2015/0317486 A1 | 11/2015 | Muller | |
| 2016/0014299 A1 | 1/2016 | Saka | |
| 2016/0275526 A1 | 9/2016 | Becanovic | |
| 2018/0189592 A1 | 7/2018 | Annis | |
| 2018/0329890 A1 | 11/2018 | Ito | |
| 2019/0138660 A1 | 5/2019 | White | |
| 2019/0171634 A1 | 6/2019 | Nowakiewicz | |
| 2019/0286900 A1 | 9/2019 | Pepe, Jr. | |
| 2019/0340949 A1 | 11/2019 | Meisner | |
| 2020/0004749 A1 | 1/2020 | Slezak | |
| 2020/0089946 A1 | 3/2020 | Mallick | |
| 2020/0104359 A1 | 4/2020 | Patel | |
| 2020/0159848 A1 | 5/2020 | Yeo | |
| 2020/0311349 A1 | 10/2020 | Balasubramanian | |
| 2020/0320072 A1 | 10/2020 | Hormati | |
| 2020/0364343 A1 | 11/2020 | Atighetchi | |
| 2020/0379673 A1 | 12/2020 | Le Gallo-Bourdeau | |
| 2021/0034621 A1 | 2/2021 | Patel | |
| 2021/0258448 A1 | 8/2021 | Yuusuke | |
| 2022/0164346 A1 | 5/2022 | Mitra | |
| 2022/0398858 A1 | 12/2022 | Cahn | |
| 2022/0414075 A1 | 12/2022 | Li | |
| 2022/0414430 A1 | 12/2022 | Li | |
| 2022/0414492 A1 | 12/2022 | Jezewski | |
| 2023/0044564 A1 | 2/2023 | Jezewski | |
| 2023/0315731 A1 | 10/2023 | Liqi | |
| 2023/0334889 A1 | 10/2023 | Cahn | |
| 2023/0385261 A1 | 11/2023 | Siddiqui | |
| 2024/0096125 A1* | 3/2024 | Yebes Torres | G06N 3/042 |
| 2024/0202539 A1 | 6/2024 | Poirier | |
| 2024/0221007 A1 | 7/2024 | Hormati | |
| 2024/0256965 A1 | 8/2024 | Chung | |
| 2024/0311407 A1* | 9/2024 | Barron | G06F 16/3344 |
| 2024/0338361 A1* | 10/2024 | Hazel | G06F 16/2423 |
| 2025/0045314 A1* | 2/2025 | Madnani | G06F 16/3329 |
| 2025/0045445 A1 | 2/2025 | Srinivasan | |
| 2025/0077527 A1* | 3/2025 | Vaughn | G06F 16/3334 |
| 2025/0086190 A1* | 3/2025 | Azarmi | G06F 16/24578 |
| 2025/0111167 A1 | 4/2025 | Mcintyre | |
| 2025/0111237 A1 | 4/2025 | Krishnamurthy | |
| 2025/0117605 A1 | 4/2025 | De Wynter | |
| 2025/0165714 A1 | 5/2025 | Krabach | |

FOREIGN PATENT DOCUMENTS

| | | | | |
|---|---|---|---|---|
| CN | 118656482 A | * | 9/2024 | G06F 16/338 |
| CN | 118939782 A | * | 11/2024 | G06F 16/9024 |

OTHER PUBLICATIONS

Doermann et al., "Image Based Typographic Analysis of Documents", Proceedings of 2nd International Conference on Document Analysis and Recognition, pp. 769-773, 1993 IEEE. (Year: 1993).

Shafait ("Document image analysis with OCRopus," IEEE 13th International Mulititopic Conference; Date of Conference: Dec. 14-15, 2009) (Year: 2009) 6 pages.

Singh et al. (A Proposed Approach for Character Recognition Using Document Analysis with OCR, Second InternationalConference on Intelligent Computing and Control Systems: Date of Conference: Jun. 14-15, 2018) (Year: 2018) 6 pages.

Slavin et al., "Matching Digital Copies of Documents Based on OCR", 2019 XXI International Conference Complex Systems: Control and Modeling Problems (CSCMP), pp. 177-181, published on Sep. 1, 2019. (Year: 2019).

Li, M., Zhao, Y., Yu, B., Song, F., Li, H., Yu, H., & Li, Y. (2023). Api-bank: A comprehensive benchmark for tool-augmented llms. arXiv preprint arXiv:2304.08244. (Year: 2023).

Schick, T., Dwivedi-Yu, J., Dessì, R., Raileanu, R., Lomeli, M., Hambro, E., & Scialom, T. (2023). Toolformer: Language models can teach themselves to use tools. Advances in Neural Information Processing Systems, 36, 68539-68551. (Year: 2023).

Qiao, S., Gui, H., Lv, C., Jia, Q., Chen, H., & Zhang, N. (2023). Making language models better tool learners with execution feedback. arXiv preprint arXiv:2305.13068. (Year: 2023).

Paranjape, B., Lundberg, S., Singh, S., Hajishirzi, H., Zettlemoyer, L., & Ribeiro, M. T. (2023). Art: Automatic multi-step reasoning and tool-use for large language models. arXiv preprint arXiv:2303.09014. (Year: 2023).

* cited by examiner

Two roads diverged in a yellow wood, ← 31
And sorry I could not travel both
And be one traveler, long I stood
And looked down one as far as I could
To where it bent in the undergrowth;

Then took the other, as just as fair, ← 32
And having perhaps the better claim,
Because it was grassy and wanted wear;
Though as for that the passing there
Had worn them really about the same, And both that morning equally lay ← 33
In leaves no step had trodden black.
Oh, I kept the first for another day!
Yet knowing how way leads on to way,
I doubted if I should ever come back.

I shall be telling this with a sigh ← 34
Somewhere ages and ages hence:
Two roads diverged in a wood, and I—
I took the one less traveled by,
And that has made all the difference.

SYSTEMS AND METHODS FOR AGENT-CONTROLLED FEDERATED RETRIEVAL-AUGMENTED GENERATION

FIELD OF THE DISCLOSURE

The present disclosure relates to systems and methods for agent-controlled retrieval-augmented generation, and, in particular, agent-controlled federated retrieval-augmented generation.

BACKGROUND

Some applications and uses of retrieval-augmented generation are known. Extraction information from electronic files and/or other documents is known. Presenting information in user interfaces is known. Large language models are known.

SUMMARY

One aspect of the present disclosure relates to a system configured to control retrieval-augmented generation (RAG) using a set of vector databases. Retrieval-augmented generation may be used for electronic files (including documents and/or other digital content, e.g., stored in file storages, databases, and/or other electronic storage) that are too numerous and/or large to be used in their entirety for a machine learning model such as, e.g., a large language model. Additionally, different sets of electronic files may be hosted, controlled, and/or located at different locations. In some implementations, the system may operate as a group of sub-systems that individually perform retrieval-augmented generation (RAG) on individual corresponding vector databases. This group may be referred to as a federation, and the resulting operation as federated retrieval-augmented generation. The system may include one or more hardware processors configured by machine-readable instructions. The system may be configured to convert content within (local) sets of electronic files into (local) sets of vector embeddings stored in different vector databases. The system may be configured to receive user input representing a user query. The system may be configured to generate agent queries (also referred to as "sub-queries") based on (sub)tasks included in the user query. The system may be configured to select subsets of the vector embeddings based on the agent queries. The system may be configured to provide the subsets to one or more machine learning models as context. The system may be configured to provide prompts to the one or more machine learning models. The system may be configured to obtain replies in response to the prompts. The system may be configured to generate a (user) reply to the user query, based on obtained replies from the one or more machine learning models. The system may be configured to effectuate a presentation of the reply. The system may be configured to perform other steps.

Another aspect of the present disclosure relates to a method of controlling retrieval-augmented generation (RAG) using a set of vector databases. The method may include converting content within sets of electronic files into sets of vector embeddings stored in different vector databases. The method may include receiving user input representing a user query. The method may include generating agent queries based on tasks included in the user query. The method may include selecting subsets of the vector embeddings based on the agent queries. The method may include providing the subsets to one or more machine learning models as context. The method may include providing prompts to the one or more machine learning models. The method may include obtaining replies in response to the prompts. The method may include generating a reply to the user query. The method may include effectuating a presentation of the reply. The method may include performing other steps.

As used herein, any association (or relation, or reflection, or indication, or correspondency) involving servers, processors, sub-systems, client computing platforms, documents, formats, electronic files, blocks of content, characters, vectors, vector embeddings, presentations, extracted information, user interfaces, user interface elements, fields, portions, queries, tasks, replies, prompts, models, representations, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, extract, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
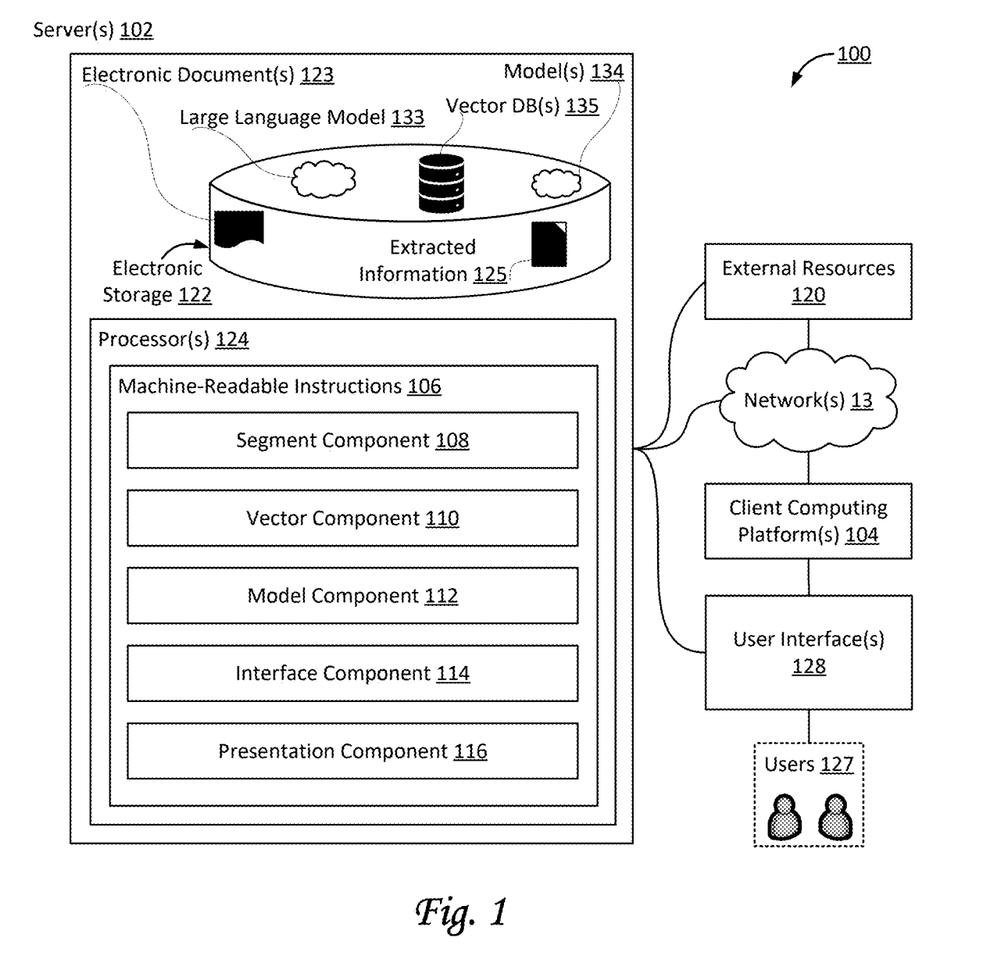
FIG. 1 illustrates a system configured for controlling retrieval-augmented generation (RAG) using a set of vector databases, in accordance with one or more implementations.

FIG. 1 illustrates a system 100 configured to control retrieval-augmented generation (RAG) using a set of vector databases 135. As used herein, retrieval-augmented generation (RAG) may use one or more models 134 (which may include one or more machine learning models) to process and/or analyze a set of one or more (electronic) documents 123, in accordance with one or more implementations. In some implementations, system 100 may include one or more servers 102, one or more client computing platforms 104, one or more user interfaces 128, external resources 120, a large language model 133, one or more other models 134, and/or other components. System 100 and/or server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users 127 may access system 100 via client computing platform(s) 104. In some implementations, individual user interfaces 128 may be associated with individual client computing platforms 104.

By virtue of the systems and methods disclosed herein, a user may use one or more models 134 (e.g., a machine learning model such as large language model 133) to extract information from (or generate information based on) a set of electronic files, even though the set of electronic files is sufficiently large (e.g., spanning at least 200 pages) that using the entirety of the set as context exceeds the capacity (e.g., in pages, vectors, tokens, and/or another measure of information quantity) of an individual machine learning model (e.g., from one or more models 134) to be used as context. Instead, a query-specific subset or portion of the set of electronic files is used as context. In some implementations, system 100 may operate as a group of sub-systems that individually perform retrieval-augmented generation (RAG) on individual corresponding vector databases. This group may be referred to as a federation, and the resulting operation as federated retrieval-augmented generation (FRAG). The operations of this federated retrieval-augmented generation may be controlled centrally, by an element or component referred to as an agent (or, in some cases, a "server"). The agent may determine which agent queries (or sub-queries) should be handled by, delegated to, and/or otherwise controlled by which individual (FRAG) sub-system and/or using which individual vector database (or local set of electronic files). In some implementations, individual FRAG sub-systems may be referred to as FRAG clients (i.e., of the agent, meaning of the central agent, as distinguished from potential sub-system-level agents, client agents, or local agents). By way of non-limiting example, the systems and methods disclosed herein may be used to process and/or analyze a mortgage application, a loan application, an insurance claim, financial reports, corporate information, technical information, an application for an identity document, and/or other uses of (automatically) extracting information from electronic files (or generating information based on the content of electronic files).

Server(s) 102 may be configured by machine-readable instructions 106. Machine-readable instructions 106 may include one or more instruction components. The instruction components may include computer program components. The instruction components may include one or more of a segment component 108, a vector component 110, a model component 112, an interface component 114, a presentation component 116, and/or other instruction components.

Segment component 108 may be configured to obtain and/or retrieve electronic files, including but not limited to electronic documents 123, including scanned images, captured photographs, and/or other documents in electronic format. As used herein, the terms "electronic document" and "electronic source document", and derivatives thereof, may be used interchangeably. In some implementations, multiple documents may form a set of documents. For example, the set of documents may be provided as input and/or context for extracting information.

Segment component 108 may be configured to create and/or otherwise determine document segments from a file, a page, a document, and/or a set thereof. As used herein, document segments may be referred to as document chunks. For example, a document segment may be a portion or segment of a file, a page, a document, and/or a set thereof. For example, a particular document segment may be one or more paragraphs or sentences of a document. In some cases, a particular document segment may be a caption, a title, a header, and/or a footer of a document. In some cases, a particular document segment may be a partial or entire column, row, list, table, database, and/or other structured information element contained within a file or document. Segment component 108 may create a set of document segments from a set of one or more documents. In some cases, the set of one or more documents may span at least 200 pages, at least 300 pages, at least 400 pages, at least 500 pages, and/or another minimum number of pages (or, in some cases, a minimum quantity of information). In some cases, the quantity of information in a set of one or more documents may be defined and/or determined not (merely) by page count, but rather by a number of segments, a number of tokens, a number of vector embeddings, and/or combinations thereof. In some implementations, the creation of document segments may be based on the type of contents on one or more pages (e.g., prose, natural language, structured information, tables, etc. etc.).

In some implementations, segment component 108 may be configured to create combinations of individual document segments. For example, a particular combination may be used as context for one or more models 134 (e.g., a machine learning model such as large language model 133). In particular, the particular combination may be used as context for a prompt provided to large language model 133, the prompt being based on a query. In some implementations, a combination of individual document segments may include those document segments that are associated with a particular subset of vector embeddings, in particular, a subset of vector embeddings that has been determined and/or selected by vector component 110 and/or another component of system 100.

In some implementations, segment component 108 may obtain and/or access documents forming a corpus of electronic documents, and/or a set of electronic documents. By way of non-limiting example, the electronic formats of the electronic documents may be one or more of Portable Document Format (PDF), Portable Network Graphics (PNG), Tagged Image File Format (TIF or TIFF), Joint Photographic Experts Group (JPG or JPEG), and/or other formats. Electronic documents may be stored and obtained as electronic files. In some implementations, an electronic document may be a scanned and/or photographed version of an original paper document and/or otherwise physical original document, or a copy of an original digital document. In some implementations, original documents may have been published, generated, produced, communicated, and/or made available by a business entity and/or government agency. Business entities may include corporate entities, non-corporate entities, and/or other entities. For example, an original document may have been communicated to customers, clients, and/or other interested parties. By way of non-limiting example, a particular original document may have been communicated by a financial institution to an account holder, by an insurance company to a policy holder or affected party, by a department of motor vehicles to a driver, etc. In some implementations, original documents may include financial reports, financial records, and/or other financial documents.

As used herein, documents may be referred to as "source documents" when the documents are originally published, generated, produced, communicated, and/or made available, or when the documents are copies thereof. Alternatively, and/or simultaneously, documents may be referred to as "source documents" when the documents are a source of human-readable information, or a basis or a container for human-readable information.

In some implementations, one or more electronic formats used for the electronic documents may encode visual information that represents human-readable information. For example, the human-readable information may be positioned on multiple line positions. In some implementations, the visual information may include one or more blocks of content, such as, e.g., a first block of content, a second block of content, and so forth. Blocks of content may represent human-readable information, such as characters, words, dates, amounts, phrases, etc. In a particular case, different blocks of content may be (positioned) on different lines or line positions. For example, the first block of content may be positioned above or below the second block of content. For example, a third block of content may be positioned above or below a fourth block of content. As an example, two characters could be vertically aligned if they are positioned on the same line, so neither is above or below the other. For example, the elements in a row of a table may be vertically aligned, and the elements in a column of a table may be horizontally aligned.

In some implementations, one or more electronic formats used for the electronic documents may be such that, upon presentation of the electronic documents through user interfaces 128, the presentation(s) include human-readable information. By way of non-limiting example, human-readable information may include any combination of numbers, letters, diacritics, symbols, punctuation, and/or other information (jointly referred to herein as "characters"), which may be in any combination of alphabets, syllabaries, and/or logographic systems. In some implementations, characters may be grouped and/or otherwise organized into groups of characters (e.g., any word in this disclosure may be an example of a group of characters, particularly a group of alphanumerical characters). For example, a particular electronic document 123 may include multiple groups of characters, such as, e.g., a first group of characters, a second group of characters, a third group of characters, a fourth group of characters, and so forth. Groups of characters may be included in blocks of content.

The electronic formats may be suitable and/or intended for human readers, and not, for example, a binary format that is not suitable for human readers. For example, the electronic format referred to as "PDF" is suitable and intended for human readers when presented using a particular application (e.g., an application referred to as a "pdf reader"). In some implementations, particular electronic document 123 may represent one or more of a bank statement, a financial record, a photocopy of a physical document from a government agency, and/or other documents. For example, a particular electronic document 123 may include a captured and/or generated image and/or video. For example, a particular electronic document 123 may be a captured and/or generated image. The electronic documents obtained by segment component 108 may have a particular size and/or resolution.

Vector component 110 may be configured to convert content within sets of electronic files into sets of vector embeddings. Vector component 110 may be configured to provide (parts of) electronic files (e.g., document segments as created and/or otherwise determined by segment component 108) to a machine learning model 134 (e.g., an embedding model as provided by OPENAI™, an embedding model based on or derived from Bidirectional Encoder Representations from Transformers (BERT), an embedding model based on GOOGLE's WORD2VEC™, etc.) for converting and/or otherwise creating vector embeddings. Vector embeddings represent semantic and/or textual information in electronic files numerically through hyperdimensional vectors. In some implementations, one or more machine learning models 134 (e.g., an embedding model and/or large language model 133) may be external to system 100. For example, system 100 may interact with one or more machine learning models 134 through application programming interfaces (APIs). In some implementations, one or more machine learning models 134 (e.g., an embedding model and/or large language model 133) may be client-specific (i.e., specific to an individual FRAG sub-system) and/or local, e.g., to a particular set of electronic files. See, by way of non-limiting example, first set of electronic files 123a in FIG. 4 and in FIG. 5.

Content within different sets of electronic files may be converted into different sets of vector embeddings. In some implementations, a vector embedding may refer to content that can change over time, such as, e.g., content in a database. For example, a particular vector embedding may refer to a location in a particular database where particular information is stored. Vector databases 135 may include a first vector database, a second vector database, a third vector database, and so forth. Different sets of vector embeddings may be stored in different vector databases 135. For example, content within a first set of electronic files stored and/or controlled at a first location may be converted into a first set of vector embeddings (and/or references) and stored in a first vector database 135, e.g., in electronic storage at the first location. For example, content within a second set of electronic files stored and/or controlled at a second location may be converted into a second set of vector embeddings (and/or references) and stored in a second vector database 135, e.g., in electronic storage at the second location. For example, content within a third set of electronic files stored and/or controlled at a third location may be converted into a third set of vector embeddings (and/or references) and stored in a third vector database 135, e.g., in electronic storage at the third location, and so forth. Vector component 110 may be configured to store vectors and/or other information in vector database(s) 135 and/or other storage, including but not limited to electronic storage 122.

Vectors embeddings (or simply "vectors") may represent semantic information. As used herein, vectors may represent what text means by a set of numbers, sometimes referred to as text embeddings. Such vectors may have hundreds or thousands of dimensions, and the values for these dimensions may be stored and/or organized in an array of floating point numbers. For example, model component 112 may create a query vector that semantically represents a particular query. In some implementations, model component 112 may use one or more models 134, such as large language model 133, to determine and/or create vector embeddings.

Interface component 114 may be configured to receive user input representing user queries, e.g., through user interfaces 128. User input may represent user queries. In some implementations, a particular user query may entail and/or include a set or sequence of tasks or steps, whether explicitly or implicitly. For example, a set of tasks may include a first task, a second task, and so forth (these may be referred to as sub-tasks). In some implementations, a first task may be associated with a first set of electronic files, a second task may be associated with a second set of electronic files, and so forth. In some implementations, a particular (compound) task may depend on other tasks as input, e.g., on the first task, the second task, etc.

In some cases, a particular user query explicitly defines tasks and/or a logical sequence and/or relation between tasks. In other cases, a particular user query can be converted (e.g., through using large language model 134) into a logical sequence of (sub)tasks, which may include and/or require the use of other tools, such as calculators, translators, summarizers, and/or other tools. In some implementations, a sequence of (sub)tasks can be used to generate and/or create one or more agent queries (or sub-queries, e.g., through using large language model 134). For example, a first agent query may be generated based on a first task, a second agent query may be generated based on a second task, and so forth. For example, a first reply to the first agent query may be based on the content of the first set of electronic files (e.g., controlled in a first location, and corresponding to a first local vector database used by a first FRAG sub-system), a second reply to the second agent query may be based on the content of the second set of electronic files (e.g., controlled in a second location, and corresponding to a second local vector database used by a second FRAG sub-system), and so forth. In some implementations, interface component 114 may operate, and be referred to, as the agent controlling federated retrieval-augmented generation in system 100. In some implementations, individual FRAG sub-systems may include a local agent or interface component similar to interface component 114, configured to convert a particular (compound) query into smaller queries, and/or answer a particular query using one or more replies.

In some implementations, vector component 110 may be configured to convert queries to vector embeddings, (e.g., using an embedding model as provided by OPENAI™, or another embedding model). For example, an agent query may be converted to a vector embedding (also referred to as an agent vector embedding and/or a retrieval vector embedding). In some implementations, vector component 110 may be configured to select a subset of a set of vector embeddings, e.g., based on an agent query and/or an agent vector embedding. For example, vector component 110 may select a first subset of a first set of vector embeddings based on a first agent query (and/or based on a first agent vector embedding based on the first agent query), a second subset of a second set of vector embeddings based on a second agent query (and/or based on a second agent vector embedding based on the second agent query), and so forth. In some implementations, selections by vector component 110 may be based on a first type of comparisons, a second type of comparisons, and/or other types of comparisons. For example, a first type of comparisons may compare a vector embedding (e.g., a particular retrieval vector embedding) with other vector embeddings (e.g., as stored in vector database 135). In some implementations, such a comparison may be based on one or more of semantic distance, Euclidean distance, (cosine) similarity, and/or dot product similarity. For example, different words having similar meanings may have a smaller semantic distance (or more similarity) than unrelated words. For example, "fruit" and "juice" may have a smaller semantic distance than "bicycle" and "goldfish". As another example, a second type of comparisons may use keyword matching and/or keyword searching, in which two words need to match verbatim and/or to the letter. By way of non-limiting example, measuring similarity between vector embeddings may include calculating inner product, cosine similarity, Euclidean distance, Jaccard similarity, Manhattan similarity, and/or another similarity metric.

Model component 112 may be configured to provide information to one or more machine learning models 134, including large language model 133. Model component 112 may provide (a reference to) a prompt to a particular large language model 133 for a response, i.e., to get one or more replies. Model component 112 may obtain (references to) sets or subsets of vector embeddings from vector databases 135. Model component 112 may provide (references to) sets or subsets of vector embeddings to a particular large language model 133, e.g., as context for a particular prompt. In some implementations, model component 112 may provide (references to) sets of document segments to a particular large language model 133, e.g., as context for a particular prompt. In some implementations, large language model 133 may have been trained on at least a million electronic files. In some implementations, large language model 133 may have been trained on at least 100 million electronic files. In some implementations, large language model 133 may include and/or be based on a neural network using over a billion parameters and/or weights. In some implementations, large language model 133 may include and/or be based on a neural network using over a 100 billion parameters and/or weights. In some implementations, large language model 133 may be based on Generative Pre-trained Transformer 3 (GPT3). In some implementations, large language model 133 may be based on GPT3.5 or GPT4, as developed by OPENAI™. In some implementations, large language model 133 may be (derived from) Generative Pre-trained Transformer 3 (GPT3) or a successor of Generative Pre-trained Transformer 3 (GPT3). In some implementations, large language model 133 may be (derived from) Large Language Model Meta AI (LLAMA) by META™, or a successor. In some implementations, large language model 133 may be (derived from) PALM2™ by GOOGLE™, or a successor.

Model component 112 may be configured to receive and/or obtain replies from one or more machine learning models 134, including large language model 133. In particular, model component 112 may receive particular replies to particular prompts that have been provided to large language model 133. For example, model component 112 may receive a first reply to a first prompt, a second reply to a second prompt, and so forth.

In some implementations, interface component 114 may be configured to generate a reply based on multiple replies obtained by model component 112. For example, a particular reply may be generated based on a first reply and a second reply. In some implementations, the first and second reply may serve as inputs to one or more tools to generate the particular reply. For example, the particular reply may be derived arithmetically from the first and second reply as input.

Referring to FIG. 1, presentation component 116 may be configured to generate, effectuate, and/or present presentations and/or user interfaces 128 (e.g., on client computing platforms 104) to users 127. For example, presentation component 116 may be configured to present a particular user interface 128 on a particular client computing platform 104 to a particular user. In some implementations, particular user interface 128 may be configured to obtain (entry of) user input from a particular user. For example, the user input may be a particular user query from the particular user (e.g., to be provided to one or more models 134, such as large language model 133). In some implementations, the user input may select one or more electronic files, including but not limited to a set of electronic files. In some implementations, the one or more electronic files may be provided as input and/or context to extract information or to generate information.

Referring to FIG. 1, in some implementations, presentation component 116 may be configured to present one or more graphical user interface elements on one or more user interfaces 128, e.g., responsive to a selection by a user (e.g., through user input received by interface component 114). In some implementations, presentation component 116 may present particular information in a particular portion of particular user interface 128.

User interfaces 128 may be configured to enable users 127 to control (e.g., through user input) the extraction or generation of information from one or more electronic files. Extraction or generation of information may be performed using large language model 133 (e.g., using one or more particular documents as input and/or context). In some implementations, the extraction or generation of information may be user-directed, i.e., controlled by an individual one of users 127 through user input into a particular user interface 128.

In some implementations, model component 112 may be configured to obtain, access, use, and/or fine-tune one or more models 134, e.g., such as large language model 133. In some implementations, model component 112 may be configured to fine-tune large language model 133 through a set of files and/or documents (e.g., training documents). In some cases, the training documents may include financial documents, including but not limited to bank statements, insurance documents, mortgage documents, loan documents, and/or other financial documents. Large language model 133 may be able to determine and/or use whether information is formatted in a column, or a row, or a table, or a database. Accordingly, information elements in a column, or a row, or a table, or a database may be contextually and/or semantically linked and/or otherwise connected such that large language model 133 may extract information from a particular document based on knowledge of the formatted information in the particular document.

In some implementations, another type of comparison used for determinations by vector component 110 may be based on absolute positioning of a corresponding document segment within a particular set of documents. For example, the first page of a particular set of documents may be an important absolute position for determinations by vector component 110. Likewise, in some cases, the last page of a particular set of documents may be an important absolute position for determinations by vector component 110.

In some implementations, another type of comparison used for determinations by vector component 110 may be based on relative positioning of a corresponding document segment within a particular set of documents. For example, a document segment adjacent to another document segment that was previously selected (e.g., based on the first or second type of comparisons) may be an important document segment for determinations by vector component 110.

Figure 3A:
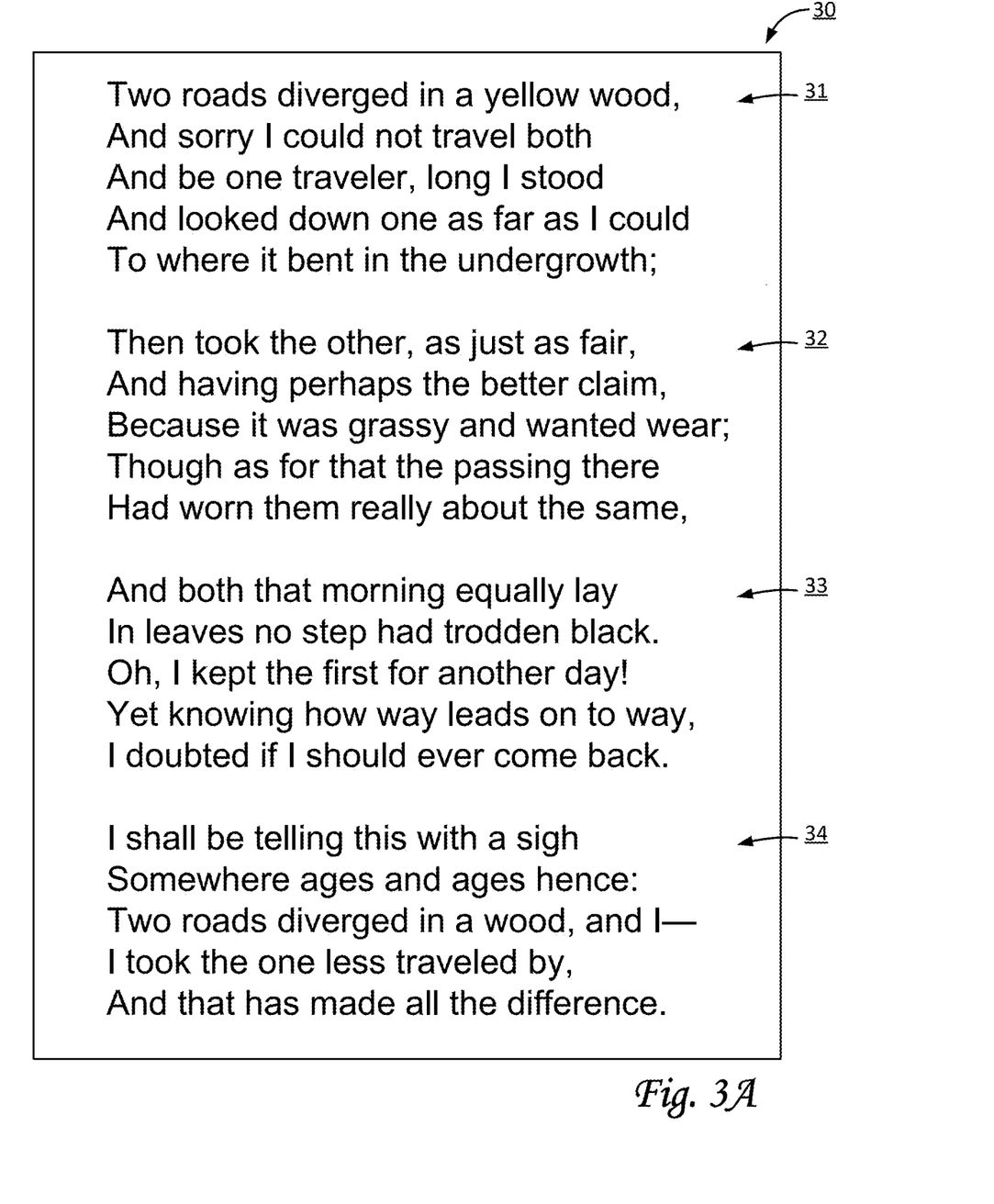
FIG. 3A illustrates an exemplary electronic document as may be used in a system configured for controlling retrieval-augmented generation (RAG) using a set of vector databases, in accordance with one or more implementations.

By way of non-limiting example, FIG. 3A illustrates an exemplary page 30 of an exemplary document as may be used in system 100 (of FIG. 1), in accordance with one or more implementations. As depicted, exemplary page 30 includes a first paragraph 31, a second paragraph 32, a third paragraph 33, and a fourth paragraph 34. In some cases, individual paragraphs may be individual document segments (e.g., as created and used by segment component 108). Alternatively, and/or simultaneously, individual sentences within a paragraph may be individual document segments (e.g., as created and used by segment component 108). For example, first paragraph 31 includes five sentences. Exemplary page 30 may contain prose, narrative, and/or other natural language. In some cases, contents similar in type to exemplary document 30 may be suitable for natural language searching. A suitable type of comparison for similar content may be the first type of comparison as performed by vector component 110. For example, if a query is about "danger", or "deadly", or "poison", the word "venenatis" (from the Latin word for poisonous) in first paragraph 31 would be relevant. Likewise, document segments that include this word (such as, by way of non-limiting example, the third sentence of first paragraph 31) may be relevant. In some cases, adjacent paragraphs or document segments (such as, by way of non-limiting example, second paragraph 32) may be relevant. Vector component 110 may select the vector embeddings for these relevant document segments as part of a particular subset of vectors (from the available vectors in vector database 135). As another example in FIG. 3A, vector component 110 may perform the second type of comparison, for a keyword search, for (part of) exemplary page 30. For example, if a query pertains to the term "suspendisse", fourth paragraph 34 contains two instances of exactly that word, in its second sentence and its last sentence. For keyword searching, fewer and/or different document segments may be relevant. Vector component 110 may select the vector embeddings for such relevant document segments as part of a particular subset of vectors (from the available vectors in vector database 135).

Figure 3B:
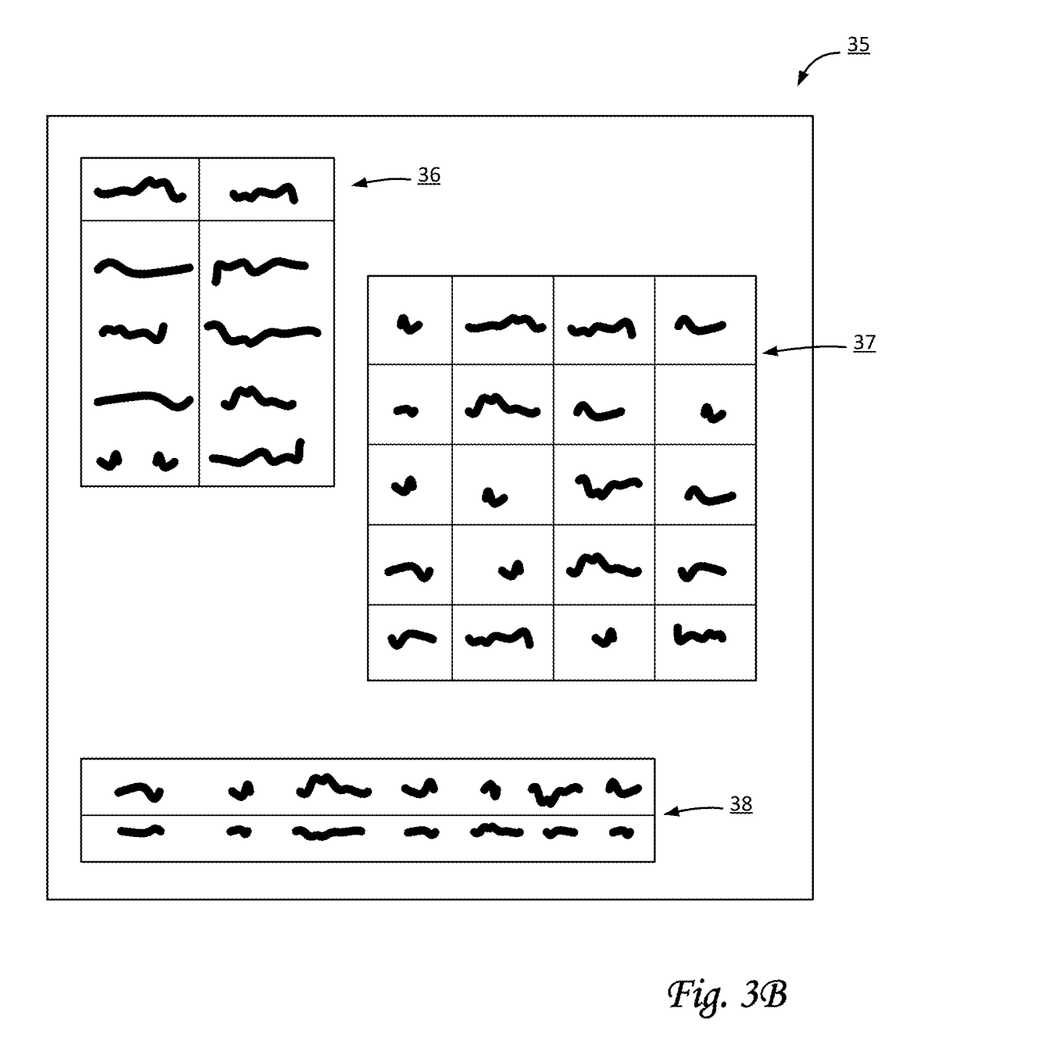
FIG. 3B illustrates an exemplary document as may be used in a system configured for controlling retrieval-augmented generation (RAG) using a set of vector databases, in accordance with one or more implementations.

By way of non-limiting example, FIG. 3B illustrates an exemplary page 35 of a sample document as may be used in system 100 (of FIG. 1), in accordance with one or more implementations. As depicted, exemplary page 35 includes a first table 36, a second table 37, and a third table 38 (the information in these tables may be any type of human-readable information). In some cases, individual tables may be individual document segments (e.g., as created by segment component 108, since information within a table or row or column may be more relevant to other information within the same table, even though other information on the same page may be literally closer when the page is presented to a reader). Alternatively, and/or simultaneously, individual cells, rows, and/or columns within a table may be individual document segments (e.g., as created by segment component 108, and having corresponding individual vector embeddings). For example, first table 36 includes two columns. Exemplary page 35 may contain structured information. In some cases, contents similar in type to exemplary page 35 may be suitable for keyword searching. Here, a suitable type of comparison for similar content may be performed by vector component 110.

Referring to FIG. 1, as used herein, the term "extract" and its variants refer to the process of identifying and/or interpreting information that is included in one or more documents, whether performed by determining, measuring, calculating, computing, estimating, approximating, interpreting, generating, and/or otherwise deriving the information, and/or any combination thereof. In some implementations, extracted information may have a semantic meaning, including but not limited to opinions, judgement, classification, and/or other meaning that may be attributed to (human and/or machine-powered) interpretation. For example, in some implementations, some types of extracted information need not literally be included in a particular electronic source document, but may be a conclusion, classification, and/or other type of result of (human and/or machine-powered) interpretation of the contents of the particular electronic source document. In some implementations, the extracted information may have been extracted by one or more extraction engines. For example, a particular extraction engine (referred to as an Optical Character Recognition engine or OCR engine) may use a document analysis process that includes optical character recognition (OCR). For example, a different extraction engine (referred to as a line engine) may use a different document analysis process that includes line detection. For example, another extraction engine (referred to as a barcode engine) may use a document analysis process that includes detection of barcodes, Quick Response (QR) codes, matrices, and/or other machine-readable optical labels. Alternatively, and/or simultaneously, in some implementations, the extracted information may have been extracted by a document analysis process that uses machine-learning (in particular deep learning) techniques. For example, (deep learning-based) computer vision technology may have been used. For example, a convolutional neural network may have been trained and used to classify (pixelated) image data as characters, photographs, diagrams, media content, and/or other types of information. In some implementations, the extracted information may have been extracted by a document analysis process that uses a pipeline of steps for object detection, object recognition, and/or object classification. In some implementations, the extracted information may have been extracted by a document analysis process that uses one or more of rule-based systems, regular expressions, deterministic extraction methods, stochastic extraction methods, and/or other techniques. In some implementations, particular document analysis processes that were used to extract the extracted information may fall outside of the scope of this disclosure, and the results of these particular document analysis processes, e.g., the extracted information, may be obtained and/or retrieved by a component of system 100.

In some implementations, server(s) 102, client computing platform(s) 104, and/or external resources 120 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable an expert or user associated with the given client computing platform 104 to interface with system 100 and/or external resources 120, and/or provide other functionality attributed herein to client computing platform (s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

User interfaces 128 may be configured to facilitate interaction between users 127 and system 100 and/or between users 127 and client computing platforms 104. For example, user interfaces 128 may provide an interface through which users may provide information to and/or receive information from system 100. In some implementations, user interface 128 may include one or more of a display screen, touchscreen, monitor, a keyboard, buttons, switches, knobs, levers, mouse, microphones, sensors to capture voice commands, sensors to capture eye movement and/or body movement, sensors to capture hand and/or finger gestures, and/or other user interface devices configured to receive and/or convey user input. In some implementations, one or more user interfaces 128 may be included in one or more client computing platforms 104. In some implementations, one or more user interfaces 128 may be included in system 100.

External resources 120 may include sources of information outside of system 100, external entities participating with system 100, and/or other resources. In some implementations, external resources 120 may include a provider of documents, including but not limited to electronic documents 123, from which system 100 and/or its components (e.g., segment component 108) may obtain documents. In some implementations, external resources 120 may include a provider of information and/or models, including but not limited to extracted information 125, model(s) 134, and/or other information from which system 100 and/or its components may obtain information and/or input. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102. In some implementations, some or all of the functionality attributed herein to server 102 and/or system 100 may be provided by resources included in one or more client computing platform(s) 104.

Electronic storage 122 may comprise non-transitory storage media that electronically stores information. The electronic storage media of electronic storage 122 may include one or more of system storage that is provided integrally (i.e., substantially non-removable) with server(s) 102, removable storage that is removably connectable or couplable to server(s) 102 via, for example, a port (e.g., a USB port, a firewire port, etc.) or a drive (e.g., a disk drive, etc.), and/or local storage provided by one or more client computing platforms 104, external resources 120, and/or other components of system 100 or connected or coupled to system 100. Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute components 108, 110, 112, 114, and/or 116, and/or other components. Processor(s) 124 may be configured to execute components 108, 110, 112, 114, and/or 116, and/or other components by software; hardware; firmware; some combination of software, hardware, and/or firmware; and/or other mechanisms for configuring processing capabilities on processor(s) 124. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 124 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 124 may be configured to execute one or more additional components that may perform some or all of the functionality attributed below to one of components 108, 110, 112, 114, and/or 116.

Figure 4:
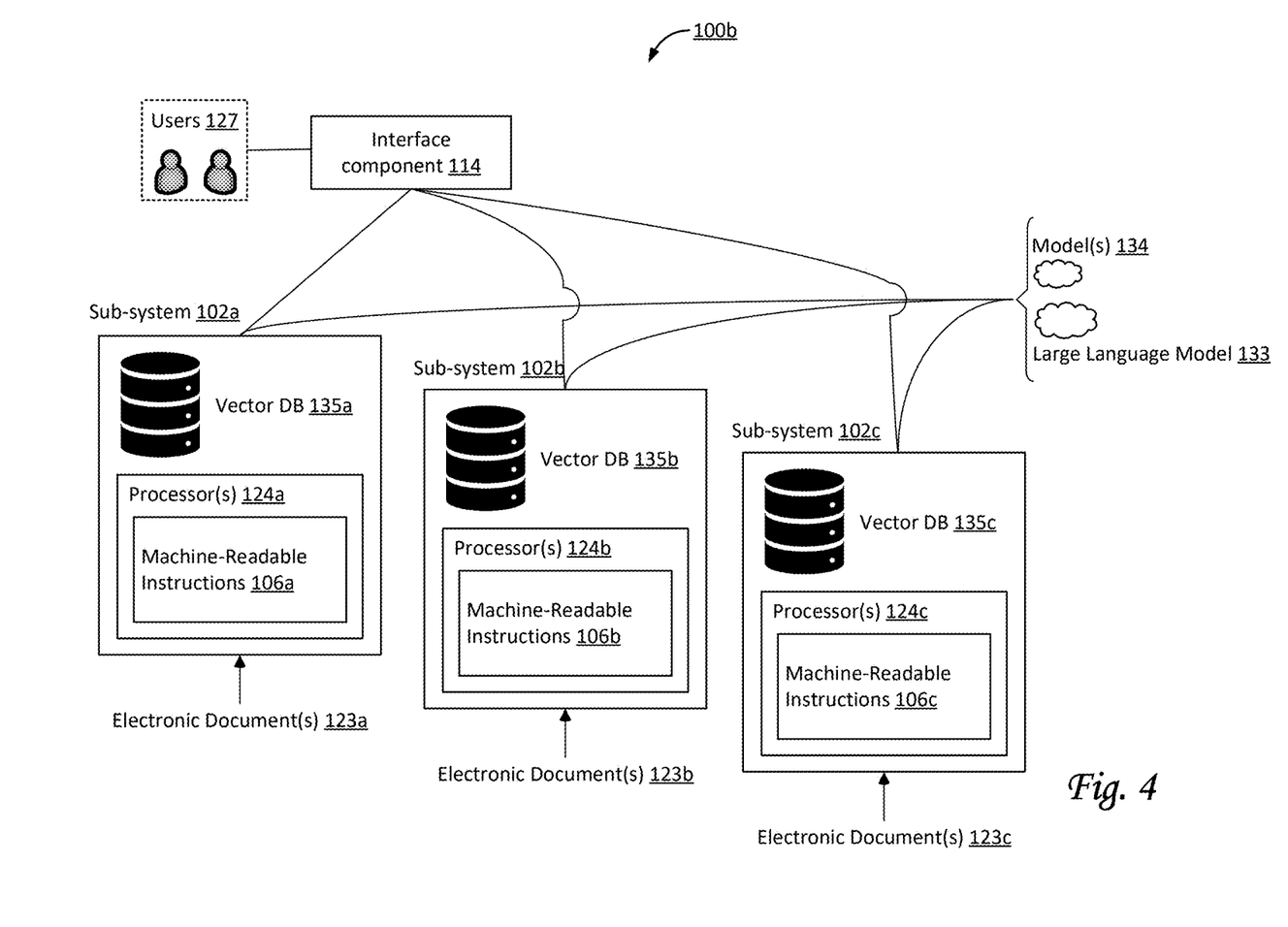
FIG. 4 illustrates a system configured for controlling retrieval-augmented generation (RAG) using a set of vector databases, in accordance with one or more implementations.

FIG. 4 illustrates a system 100b configured for controlling retrieval-augmented generation (RAG) using a set of vector databases, in accordance with one or more implementations. As depicted, and by way of non-limiting example, system 100b includes a first set of electronic documents 123a (controlled at a first location), a second set of electronic documents 123b (controlled at a second location), and a third set of electronic documents 123c (controlled at a third location). For example, first set of electronic documents 123a may include content accessible by agents and/or users at the first location. For example, the first location could include a SALESFORCE™ installation. Sub-system 102a, sub-system 102b, and sub-system 102c may be the same as or similar to server(s) 102 depicted in FIG. 1. Vector database 135a, vector database 135b, and vector database 135c may be the same as or similar to vector database(s) 135 depicted in FIG. 1, and may be specific to first set of electronic documents 123a, second set of electronic documents 123b, and third set of electronic documents 123c, respectively. In some implementations, sub-system 102a, sub-system 102b, and sub-system 102c may be referred to as FRAG sub-systems or FRAG clients. Processor(s) 124a, processor(s) 124b, and processor(s) 124c may be the same as or similar to processor(s) 124 depicted in FIG. 1. Machine-readable instructions 106a, machine-readable instructions 106b, and machine-readable instructions 106c may be the same as or similar to machine-readable instructions 106 depicted in FIG. 1. The systems and methods described and envisioned in this disclosure are not limited to three FRAG sub-systems or FRAG clients, but can use any plurality.

As depicted in FIG. 4, in system 100b, a user query is received from user(s) 127 by a component similar to or the same as interface component 114, e.g., generating a sequence of (sub)tasks which correspond to sub-queries or agent queries. Sub-queries (or agent queries) derived from the user query are provided to one of sub-system 102a, sub-system 102b, and sub-system 102c. In some implementations, a sub-system may include a local agent or interface component, e.g., configured to convert a particular (compound) query into smaller queries, and/or answer a particular query using one or more replies. A first selected subset of vector embeddings from vector database 135a is provided to one or more machine learning models 134 and/or large language model 133 as context for a first prompt, the first prompt being based on the agent query provided to sub-system 102a. A second selected subset of vector embeddings from vector database 135b is provided to one or more machine learning models 134 and/or large language model 133 as context for a second prompt, the second prompt being based on the agent query provided to sub-system 102b. A third selected subset of vector embeddings from vector database 135c is provided to one or more machine learning models 134 and/or large language model 133 as context for a third prompt, the third prompt being based on the agent query provided to sub-system 102c. The first, second, and third replies to the first, second, and third prompts are used (e.g., at the user level) to generate a reply to the user query.

Figure 5:
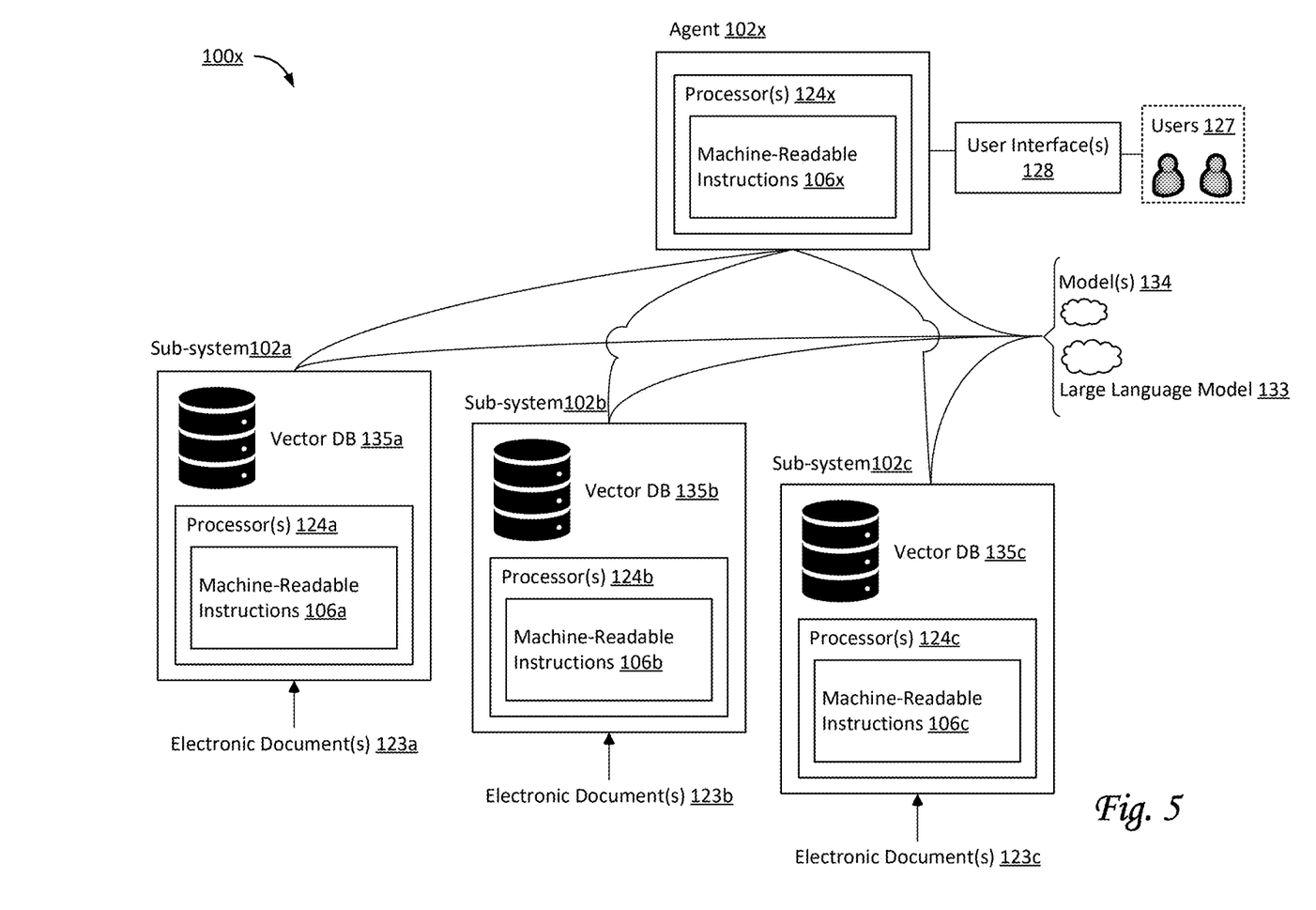
FIG. 5 illustrates a system configured for controlling retrieval-augmented generation (RAG) using a set of vector databases, in accordance with one or more implementations.

FIG. 5 illustrates a system 100x configured for controlling retrieval-augmented generation (RAG) using a set of vector databases, in accordance with one or more implementations. As depicted, system 100x includes a first set of electronic documents 123a (controlled at a first location), a second set of electronic documents 123b (controlled at a second location), and a third set of electronic documents 123c (controlled at a third location). Sub-system 102a, sub-system 102b, sub-system 102c, and agent 102x may be the same as or similar to server(s) 102 depicted in FIG. 1. Vector database 135a, vector database 135b, and vector database 135c may be the same as or similar to vector database(s) 135 depicted in FIG. 1. Processor(s) 124a, processor(s) 124b, processor(s) 124c, and processor(s) 124x may be the same as or similar to processor(s) 124 depicted in FIG. 1. Machine-readable instructions 106a, machine-readable instructions 106b, machine-readable instructions 106c, and machine-readable instructions 106x may be the same as or similar to machine-readable instructions 106 depicted in FIG. 1.

As depicted in FIG. 5, in system 100x, a user query is received from user(s) 127, via user interface 128, by agent 102x. Sub-queries (or agent queries) derived from the user query are provided to one of (FRAG) sub-system 102a, (FRAG) sub-system 102b, and (FRAG) sub-system 102c. Agent 102x may determine which sub-queries should be handled by, delegated to, and/or otherwise controlled by which individual FRAG sub-system and/or using which individual vector database. Such determination may be based on knowledge of the content of the different local sets of electronic files. In some implementations, a sub-system may include a local agent or interface component, e.g., configured to convert a particular (compound) query into smaller queries, and/or answer a particular query using one or more replies. A first selected subset of vector embeddings from vector database 135a is provided to one or more machine learning models 134 and/or large language model 133 as context for a first prompt, the first prompt being based on the agent query provided to sub-system 102a. A second selected subset of vector embeddings from vector database 135b is provided to one or more machine learning models 134 and/or large language model 133 as context for a second prompt, the second prompt being based on the agent query provided to sub-system 102b. A third selected subset of vector embeddings from vector database 135c is provided to one or more machine learning models 134 and/or large language model 133 as context for a third prompt, the third prompt being based on the agent query provided to sub-system 102c. The first, second, and third replies to the first, second, and third prompts are used by agent 102x to generate a reply to the user query.

Figure 2:
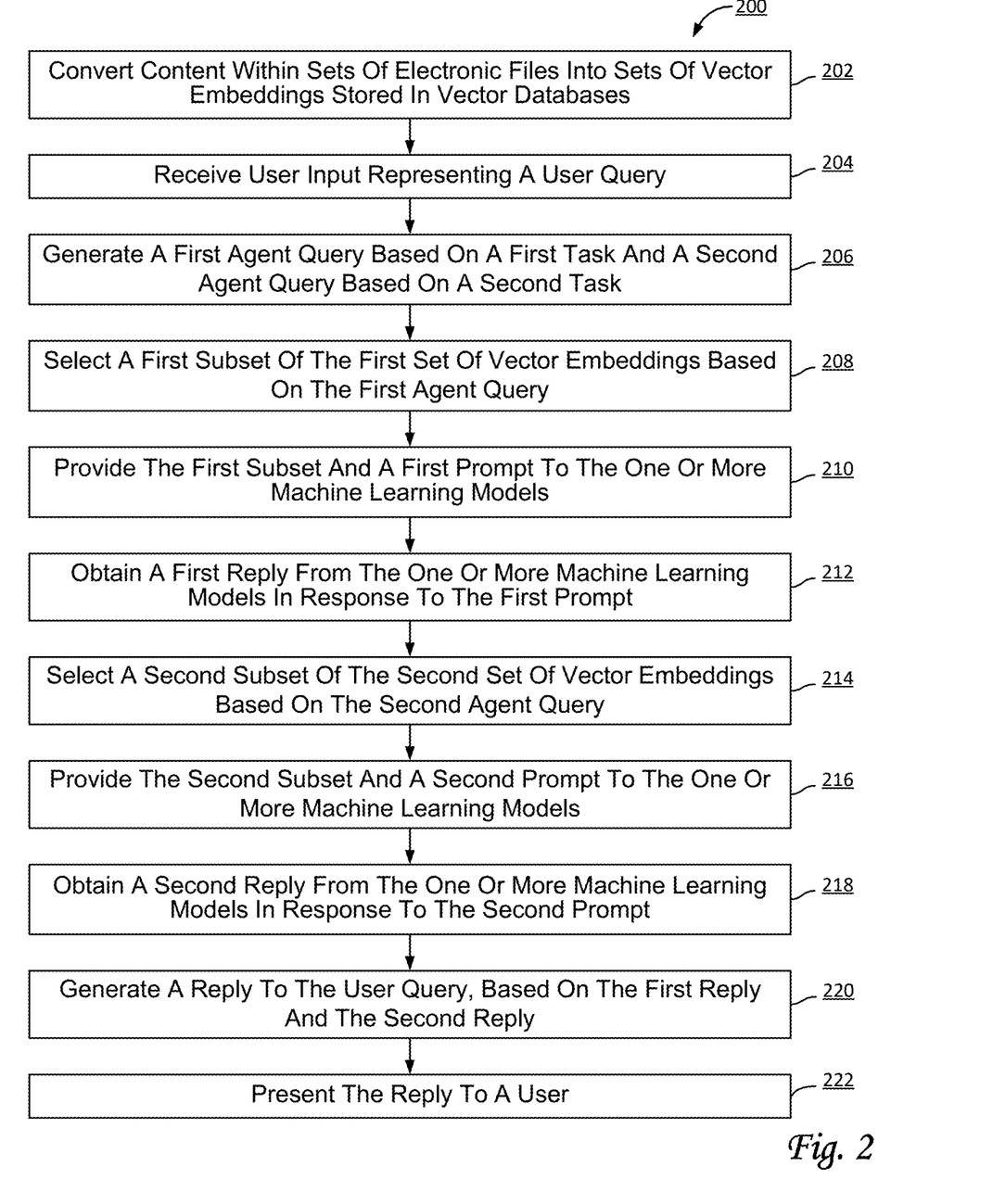
FIG. 2 illustrates a method of controlling retrieval-augmented generation (RAG) using a set of vector databases, in accordance with one or more implementations.

FIG. 2 illustrates a method 200 of controlling retrieval-augmented generation (RAG) using a set of vector databases, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting. In some implementations, at least some of the operations of method 200 may be performed in parallel. For example, steps 208-212 and steps 214-218 may occur in parallel.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202, content within a first set of electronic files is converted into a first set of vector embeddings stored in a first vector database, content within a second set of electronic files is converted into a second set of vector embeddings stored in a second vector database, and content within a third set of electronic files is converted into a second set of vector embeddings stored in a third vector database. In some embodiments, operation 202 is performed by a vector component the same as or similar to vector component 110 (shown in FIG. 1 and described herein).

At an operation 204, user input is received representing a user query. The user query entails a set of tasks. The set of tasks includes at least a first task associated with the first set of electronic files and a second task associated with the second set of electronic files. In some embodiments, operation 204 is performed by an interface component the same as or similar to interface component 114 (shown in FIG. 1 and described herein).

At an operation 206, a first agent query is generated based on the first task and a second agent query is generated based on the second task. In some embodiments, operation 206 is performed by an interface component and/or a machine learning model the same as or similar to interface component 114 and/or large language model 134 (shown in FIG. 1 and described herein).

At an operation 208, a first subset of the first set of vector embeddings is selected based on the first agent query. In some embodiments, operation 208 is performed by a vector component the same as or similar to vector component 110 (shown in FIG. 1 and described herein).

At an operation 210, the first subset of the first set of vector embeddings is provided to one or more machine learning models as context for a first prompt based on the first agent query, and the first prompt is provided to the one or more machine learning models. In some embodiments, operation 210 is performed by a model component the same as or similar to model component 112 (shown in FIG. 1 and described herein).

At an operation 212, a first reply is obtained from the one or more machine learning models in response to the first prompt. In some embodiments, operation 212 is performed by a model component the same as or similar to model component 112 (shown in FIG. 1 and described herein).

At an operation 214, a second subset of the second set of vector embeddings is selected based on the second agent query. In some embodiments, operation 214 is performed by a vector component the same as or similar to vector component 110 (shown in FIG. 1 and described herein).

At an operation 216, the second subset of the second set of vector embeddings is provided to the one or more machine learning models as context for a second prompt based on the second agent query, and the second prompt is provided to the one or more machine learning models. In some embodiments, operation 216 is performed by a model component the same as or similar to model component 112 (shown in FIG. 1 and described herein).

At an operation 218, a second reply is obtained from the one or more machine learning models in response to the second prompt. In some embodiments, operation 218 is performed by a model component the same as or similar to model component 112 (shown in FIG. 1 and described herein).

At an operation 220, a reply to the user query is generated. The reply is based on the first reply and the second reply. In some embodiments, operation 220 is performed by a interface component the same as or similar to interface component 114 (shown in FIG. 1 and described herein).

At an operation 222, a presentation of the reply is effectuated to a user, through a user interface. In some embodiments, operation 222 is performed by a presentation component the same as or similar to presentation component 116 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to control retrieval-augmented generation (RAG) using a set of multiple vector databases storing vector embeddings for multiple sets of electronic files, the system comprising:
- one or more hardware processors configured by machine readable instructions to:
  - convert content within a first set of electronic files into a first set of vector embeddings stored in a first vector database;
  - convert content within a second set of electronic files into a second set of vector embeddings stored in a second vector database;
  - convert content within a third set of electronic files into a third set of vector embeddings stored in a third vector database;
  - receive user input representing a user query, wherein the user query entails a set of tasks, wherein the set of tasks includes at least a first task associated with the first set of electronic files and a second task associated with the second set of electronic files;
  - generate a first agent query based on the first task and a second agent query based on the second task, wherein generating the first and second agent query is performed by the one or more machine learning models;
  - perform a first selection of a first subset of the first set of vector embeddings based on the first agent query, wherein performing the first selection includes generating, using an embedding model, a first retrieval vector embedding based on the first agent query, and comparing semantic distance between the vector embeddings in the first set and the first retrieval vector embedding;
  - provide the first subset of the first set of vector embeddings to one or more machine learning models as context for a first prompt based on the first agent query;
  - provide the first prompt to the one or more machine learning models;
  - obtain a first reply from the one or more machine learning models in response to the first prompt;
  - perform a second selection of a second subset of the second set of vector embeddings based on the second agent query, wherein the second selection includes generating, using the embedding model, a second retrieval vector embedding based on the second agent query and comparing semantic distance between the vector embeddings in the second set and the second retrieval vector embedding;
  - provide the second subset of the second set of vector embeddings to the one or more machine learning models as context for a second prompt based on the second agent query;
  - provide the second prompt to the one or more machine learning models;
  - obtain a second reply from the one or more machine learning models in response to the second prompt;
  - generate a reply to the user query, wherein the reply is based on the first reply and the second reply; and
  - effectuate a presentation of the reply to a user, through a user interface.

2. The system of claim 1, wherein the one or more machine learning models include a large language model (LLM).

3. The system of claim 1, wherein the first, second, and third vector databases are stored in different locations.

4. The system of claim 1, wherein the first set of vector embeddings has been generated by and received from an embedding model, wherein the embedding model is external to the system.

5. The system of claim 4, wherein the first set of vector embeddings represent semantic information in the first set of electronic files numerically through hyperdimensional vectors.

6. The system of claim 1, wherein the first agent query represents the first task numerically through a hyperdimensional vector.

7. The system of claim 1, wherein generating the reply includes:
   (i) generating a prompt based on the first reply and the second reply;
   (ii) providing the prompt to the one or more machine learning models; and
   (iii) obtaining the reply from the one or more machine learning models.

8. The system of claim 1, wherein the set of tasks includes a third task associated with the third set of files, wherein the one or more hardware processors are further configured to:
   generate a third agent query based on the third task, using the embedding model;
   select a third subset of the third set of vector embeddings based on the third agent query;
   provide a third subset of the third set of vector embeddings to the one or more machine learning models as context for a third prompt based on the third agent query; and
   obtain a third reply from the one or more machine learning models in response to the third prompt;
   wherein the reply to the user query is further based on the third reply.

9. The system of claim 1, wherein the set of tasks includes a third task to be completed using a particular tool, wherein the first reply and the second reply are used as inputs for the third task, wherein the one or more hardware processors are further configured to:
   perform the third task using the particular tool,
   wherein the reply is based on output from the particular tool.

10. The method of claim 1, wherein the set of tasks includes a third task associated with the third set of files, the method further comprising:
   generating a third agent query based on the third task, using the embedding model;
   selecting a third subset of the third set of vector embeddings based on the third agent query;
   providing a third subset of the third set of vector embeddings to the one or more machine learning models as context for a third prompt based on the third agent query; and
   obtaining a third reply from the one or more machine learning models in response to the third prompt;
   wherein the reply to the user query is further based on the third reply.

11. A method of controlling retrieval-augmented generation (RAG) using a set of multiple vector databases storing vector embeddings for multiple sets of electronic files, the method comprising:

converting (i) content within a first set of electronic files into a first set of vector embeddings stored in a first vector database, (ii) content within a second set of electronic files into a second set of vector embeddings stored in a second vector database, and (iii) content within a third set of electronic files into a second set of vector embeddings stored in a third vector database;

receiving user input representing a user query, wherein the user query entails a set of tasks, wherein the set of tasks includes at least a first task associated with the first set of electronic files and a second task associated with the second set of electronic files;

generating, by the one or more machine learning models, a first agent query based on the first task and a second agent query based on the second task;

performing a first selection of a first subset of the first set of vector embeddings based on the first agent query, wherein performing the first selection includes generating, using an embedding model, a first retrieval vector embedding based on the first agent query, and comparing semantic distance between the vector embeddings in the first set and the first retrieval vector embedding;

providing the first subset of the first set of vector embeddings to one or more machine learning models as context for a first prompt based on the first agent query, and providing the first prompt to the one or more machine learning models;

obtaining a first reply from the one or more machine learning models in response to the first prompt;

performing a second selection of a second subset of the second set of vector embeddings based on the second agent query, wherein performing the second selection includes generating, using the embedding model, a second retrieval vector embedding based on the second agent query, and comparing semantic distance between the vector embeddings in the second set and the second retrieval vector embedding;

providing the second subset of the second set of vector embeddings to the one or more machine learning models as context for a second prompt based on the second agent query, and providing the second prompt to the one or more machine learning models;

obtaining a second reply from the one or more machine learning models in response to the second prompt;

generating a reply to the user query, wherein the reply is based on the first reply and the second reply; and effectuating a presentation of the reply to a user, through a user interface.

12. The method of claim 11, wherein the one or more machine learning models include a large language model (LLM).

13. The method of claim 11, wherein the first, second, and third vector databases are stored in different locations.

14. The method of claim 11, wherein the first set of vector embeddings has been generated by and received from an embedding model, wherein the embedding model is external to the system.

15. The method of claim 14, wherein the first set of vector embeddings represent semantic information in the first set of electronic files numerically through hyperdimensional vectors.

16. The method of claim 11, wherein the first agent query represents the first task numerically through a hyperdimensional vector.

17. The method of claim 11, wherein generating the reply includes:

(i) generating a prompt based on the first reply and the second reply;

(ii) providing the prompt to the one or more machine learning models; and (iii) obtaining the reply from the one or more machine learning models.

18. The method of claim 11, wherein the set of tasks includes a third task to be completed using a particular tool, wherein the first reply and the second reply are used as inputs for the third task, wherein the one or more hardware processors are further configured to:

perform the third task using the particular tool, wherein the reply is based on output from the particular tool.

* * * * *